United States Patent [19]

Noel

[11] Patent Number: 5,056,633
[45] Date of Patent: Oct. 15, 1991

[54] CENTRIFUGAL CLUTCH FOR A MOTOR VEHICLE DOORLOCK ACTUATOR

[75] Inventor: Jean P. Noel, St. Die, France

[73] Assignee: Rockwell-CIM, France

[21] Appl. No.: 467,438

[22] Filed: Jan. 19, 1990

[30] Foreign Application Priority Data

Jan. 24, 1989 [FR] France ............................... 89 00820

[51] Int. Cl.$^5$ ....................... F16D 13/10; F16D 43/04
[52] U.S. Cl. ..................................... 192/35; 192/48.3; 192/80; 192/103 B; 192/105 BB
[58] Field of Search ............... 192/105 BB, 103 B, 80, 192/79, 35, 37, 48.3, 48.7, 56 C; 292/DIG. 23

[56] References Cited

U.S. PATENT DOCUMENTS

| | | | |
|---|---|---|---|
| 3,160,252 | 12/1964 | Steinlein | 192/35 |
| 4,673,073 | 1/1987 | Weatherby | 192/103 B X |
| 4,736,829 | 4/1988 | Noel | 192/71 |
| 4,926,986 | 5/1990 | Noel | 192/0.02 R |

FOREIGN PATENT DOCUMENTS 87.17423  6/1989  France .

Primary Examiner—Rodney H. Bonck

[57] ABSTRACT

This clutch comprises centrifugal weights (11) which are arranged radially in a hub (12) fastened to the output shaft (2) of an electric motor (1), returned to the position of rest by means of springs (21), and which, when the centrifugal force is sufficient, can come into engagement with the axial ends (26a) of an elastic ring (26) capable of transmitting the torque of the shaft (2) frictionally to a part (28) carrying an input pinion toothing (4) of a gear train for controlling the part to be driven. This arrangement simplifies the structure of the clutch in comparison with that of known clutches.

4 Claims, 2 Drawing Sheets

CENTRIFUGAL CLUTCH FOR A MOTOR VEHICLE DOORLOCK ACTUATOR

CENTRIFUGAL CLUTCH FOR A MOTOR VEHICLE DOORLOCK ACTUATOR

The subject of the present invention is a centrifugal clutch for an actuator for a motor-vehicle doorlock.

More specifically, this clutch is of the type intended to be interposed between an electric motor and a gear train for driving a screw, on which a control sleeve of a prevention member is mounted. This clutch comprises at least one weight which is arranged radially in a hub fastened to the output shaft of the motor and is subjected to the action of an elastic member for a return towards a disengaged position of rest and which is capable of being driven as a result of the rotation of the shaft into an engaged position, in which it projects from the hub and is in engagement with means for transmitting the torque of the shaft to the gear train.

French Patent 86.02323 of Feb. 20, 1986 in the Applicant's name and its first certificate of addition 87.17423 of Dec. 14, 1987 describe a centrifugal clutch of this type. In the certificate of addition, the means for transmitting the torque between the centrifugal weight or centrifugal weights and the gear train comprise a spring stressed to bear frictionally on the inner wall of a bell-shaped housing containing the weights and equipped with a driving pinion of the gear train. This spring is equipped at its ends with engaging clutches capable of interacting with the weights when these are in the engaged position.

The object of the invention is to simplify the structure of this clutch, whilst at the same time preserving its advantages.

According to the invention, the said transmission means comprise an elastic ring mounted to bear frictionally on a support coaxial relative to one end of the output shaft beyond the hub and equipped with a driving pinion, and the ring has two end parts confronting one another and radially opposite the weight, in such a way that the latter can come to bear on these end parts when it is pushed there as a result of a sufficient centrifugal force, the ring thereby driving the support and its pinion in rotation.

According to one embodiment of the invention, the support of the ring comprises a transverse cover equipped with means for fixing it to the pinion, and a groove for receiving the ring is delimited between the pinion and the cover, this groove being coaxial relative to the shaft and the two end parts of the ring extending axially beyond the groove and opposite the weight.

Other particular features and advantages of the invention will emerge from the following description made with reference to the accompanying drawing which illustrates an embodiment of it by way of non-limiting example.

Figure 1:
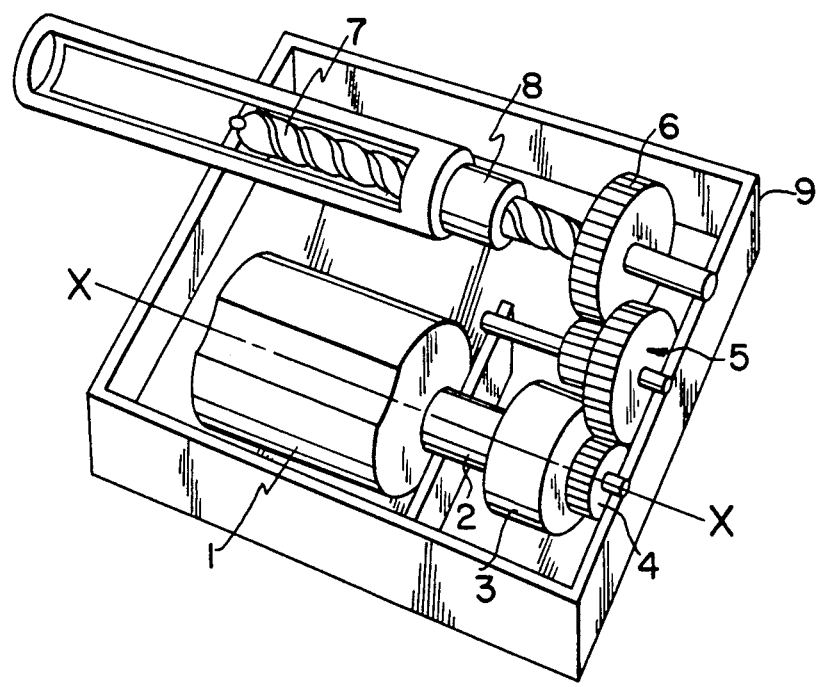
FIG. 1 is a perspective view of an actuator for a motor-vehicle doorlock, equipped with a clutch which can be of the type to which the invention refers.

The actuator illustrated in FIG. 1 is intended to allow the use of a lock (not shown) of a motor-vehicle door by actuation of an electric motor.

It comprises an electric motor 1 equipped with a driving output shaft 2 of axis X—X, passing axially right through a centrifugal clutch 3 equipped with an end pinion 4 forming the first element of a gear train 5.

The last pinion 6 of the train 5 is fastened to a screw 7, on which is mounted a sleeve 8 which can be driven in translational motion as a result of the rotation of the screw 7, in order to actuate the member (not shown) of the lock, all these parts being accomodated in a case 9.

The centrifugal clutch 3 illustrated in FIGS. 2 to 5 comprises two weights 11 preferably formed by cylindrical parts and arranged radially diametrically opposite one another in a hub 12 fastened to the output shaft 2 passing through it. An insert 18 within the hub 12 is interposed between the weights 11 and the motor 1. Each weight 11 is subjected to the action of a helical return spring 21 surrounding the corresponding weight 11. Each spring 21 is compressed between, on the one hand, the periphery of a washer 11a fastened to the weight 11 and bearing on the shaft 2 when the weight 11 is at rest and, on the other hand, an annular shoulder 20 located inside the hub 12.

Figure 2:
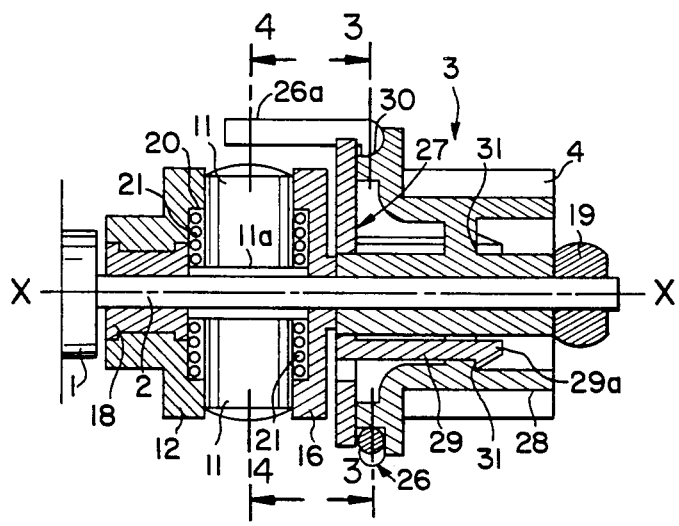
FIG. 2 is a view in axial section of an embodiment of a centrifugal clutch according to the invention which can equip the actuator of FIG. 1.
Figure 3:
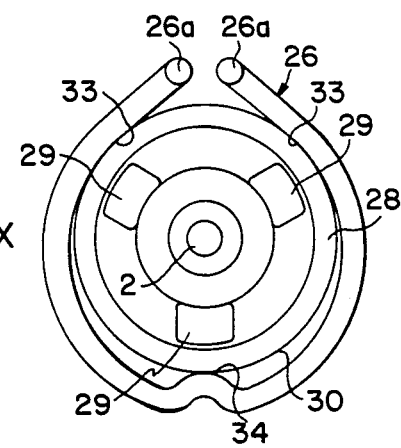
FIG. 3 is a cross-sectional view according to 3—3 of FIG. 2.
Figure 4:
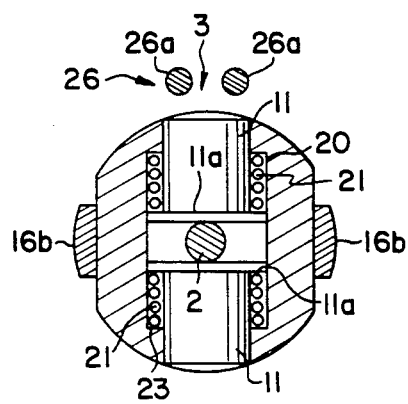
FIG. 4 is a cross-sectional view according to 4—4 of FIG. 2.

The springs 21 stress the weights 11 elastically towards their position of rest bearing on the shaft 2 by means of the washers 11a (FIG. 2). From this disengaged position, the weights 11 can move apart radially when the centrifugal force is sufficient.

Figure 5:
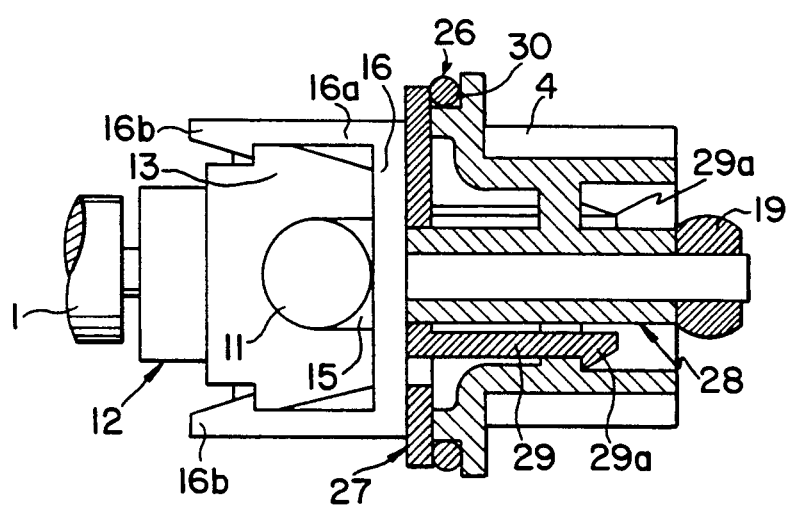
FIG. 5 is a view of the actuator of FIGS. 2 to 4 partially in plan and partially in axial section in a plane perpendicular to that of FIG. 2.

The hub 12 has two substantially axial branches 13 and 14 which are approximately parallel to the shaft 2 and which surround the weights 11, delimiting for these a receptacle 15 closed by means of a cover 16 equipped with axial tabs 16a, the ends 16b of which can snap elastically onto notches on the surface of the hub 12 (FIG. 5).

The clutch 3 possesses means for transmitting the torque of the shaft 2 to the pinion 4, which comprise an elastic ring 26 mounted to bear frictionally on a support coaxial relative to the end of the output shaft 2 beyond the hub 12. The ring 26 has two axial end parts 26a confronting one another and radially opposite the weights 11.

The support of the ring 26 comprises a transverse cover 27 equipped with means for fixing it to the pinion 4, more specifically to a structure 28 which is located inside the latter and is coaxial relative to the shaft 2 and on the periphery of which the toothing of the pinion 4 is formed. A groove 30 for receiving the ring 26 is delimited between the cover 27 and the structure 28, this groove being coaxial relative to the shaft 2 and the end parts 26a of the ring 26 projecting axially from it.

The cover 27 has means for fixing it to the structure 28 and the pinion 4. In the example illustrated, these means consist of axial arms 29, the ends 29a of which can snap elastically and removably onto radial shoulders 31 of the structure 28 through which the shaft 2 passes.

The ring 26 can bear on the bottom of the groove 30 at three points 32, 33, 34, as shown, or at more points or over the entire surface of this groove, depending on its particular shape.

A bearing 19 for supporting the shaft 2 is fastened to the latter beyond the pinion 4.

This clutch functions as follows.

When the shaft 2 rotates at sufficient speed, the weights 11 move radially apart from one another counter to the return force of their springs 21. One of them therefore comes to bear on the end parts 26a of the ring 26, whilst the other is retained at some distance from the shaft 2 as a result of the compression of the spring 21 between the washer 11a and the shoulder 20. The ring 26 then drives the cover 27 and the pinion 4 by friction.

The ring 26 can have, for example, a circular or square cross-section. The cover 27 makes it easier to mount the spring 26, making it possible to avoid exceeding the elastic limit of the latter during its mounting. The snapping of the axial arms 29 on the inner structure 28 of the pinion 4 makes it possible to close the groove 30 by means of the cover 27 and thus keep the elastic ring 26 in place there.

The shaping of the ring 26 with three bearing points 33, 34 has two advantages: greater ease of mounting of the ring 26 on its support 28 and the absence of redundant contacts of the ring on its groove 30.

When the actuator has completed its travel, at the moment when it comes up against the driven part, for example a door window-pane of the vehicle, appreciable torques are generated as a result of the inertia of the moving parts, and a sliding of the elastic ring 26 in relation to the structure 28 and to the cover 27 occurs. The advantage of this sliding is that it reduces the bounce attributable to the damping of the parts coming up against one another and eliminates inopportune disengagements which are a source of noise.

Another advantage of the torque-limiting spring formed by the elastic ring 26 is that it makes it possible to reduce the stresses in the mechanism of the actuator and in the clutch itself, and because of this only one weight 11 may be needed.

However, the presence of two symmetrical weights 11 balances the weight carrier dynamically.

The structure of the clutch according to the invention is simplified considerably in comparison with that of the known clutches, described in the abovementioned patent and addition.

It is appropriate to note that the form of the ring 26 and of its end parts 26a allows the latter to interact identically with a weight, driving the support (27, 28) and the pinion in either of the two directions of rotation of the motor. The clutch can thus function in both directions of rotation of the motor.

I claim:

1. A centrifugal clutch (3) for an actuator for a motor-vehicle doorlock, intended to be interposed between an electric motor (1) and a gear train (5) for driving a prevention member, this clutch comprising at least one weight (11) which is arranged radially in a hub (12) fastened to an output shaft (2) of a motor (1) and is subjected to the action of an elastic member (21) for a return towards a disengaged position of rest and which is capable of being driven as a result of the rotation of the shaft (2) into an engaged position, in which it projects from the hub and is in engagement with means for transmitting the torque of the shaft (2) to the gear train, characterized in that the said transmission means comprise an elastic ring (26) mounted axially beyond the weight (11) in a direction away from the motor (1) to bear frictionally on a support (27, 28) coaxial relative to the output shaft (2) beyond the hub (12) and equipped with a driving pinion (4), and the ring (26) has two end parts (26a) confronting one another and extending axially beyond said support (27, 28) to a position radially opposite the weight (11), in such a way that the weight can come to bear on the end parts when the weight is pushed as a result of a sufficient centrifugal force, the form of the end parts being such that the ring (26) can then drive the support (27, 28) and its pinion (4, 28) in rotation in either of the two directions of rotation of the motor.

2. A centrifugal clutch according to claim 1, characterized in that the support of the ring comprises a transverse cover (27) equipped with means for fixing it to the pinion (4, 28), and a groove (30) for receiving the ring (26) is delimited between the pinion (4, 28) and the cover (27), said groove being coaxial relative to the shaft (2).

3. A centrifugal clutch according to claim 2, characterized in that the fixing means comprise axial arms (29), the ends (29a) of which can snap elastically and removably onto an inner structure (28) of the pinion (4, 28).

4. A centrifugal clutch according to claim 2, characterized in that the ring (26) is shaped so as to bear frictionally either over the entire surface of the groove (30) or on three points (33, 34) of the latter.

* * * * *